Figure 1:
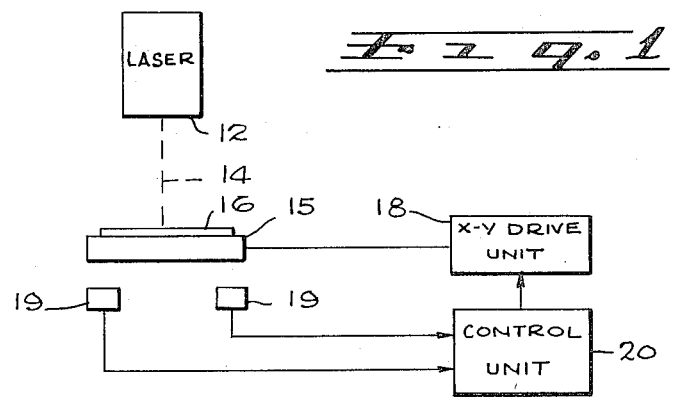

United States Patent [19]
Fredriksen

[11] 3,814,895
[45] June 4, 1974

[54] LASER SCRIBER CONTROL SYSTEM

[75] Inventor: Thorbjoern R. Fredriksen, Palo Alto, Calif.

[73] Assignee: Electroglas, Inc., Menlo Park, Calif.

[22] Filed: Dec. 27, 1971

[21] Appl. No.: 212,234

[52] U.S. Cl. ............................................ 219/121 L
[51] Int. Cl. ............................................ B23k 27/00
[58] Field of Search .................. 219/121 L, 121 EB; 318/603, 685; 235/151.11

[56] References Cited
UNITED STATES PATENTS

| | | | |
|---|---|---|---|
| 3,265,855 | 8/1966 | Norton | 219/121 LM |
| 3,353,161 | 11/1967 | Toscano | 318/603 |
| 3,414,785 | 12/1968 | Orahood et al. | 318/603 |
| 3,584,183 | 6/1971 | Chiaretta | 219/121 LM |
| 3,626,141 | 12/1971 | Daly | 219/121 L |
| 3,646,419 | 2/1972 | Holy et al. | 235/151.11 |

*Primary Examiner*—J. V. Truhe
*Attorney, Agent, or Firm*—Smyth, Roston & Pavitt

[57] ABSTRACT

A laser scribe system is disclosed for aligning a wafer on which circuits are deposited, and for controlling the motion of a chuck, supporting the wafer, so that kerfs are cut in the wafer between all the circuits. The chuck is movable along X and Y axes in a XY plane by two indexable stepping motors, with a laser providing a beam in a direction perpendicular to the XY plane. The system is operable in an Align mode in which the chuck is movable back and forth in the X axis and the chuck is rotatable about an axis perpendicular to the XY plane until streets, representing wafer space between circuits, are aligned in the X axis. The system automatically sequences through several scribing phases during which the chuck is moved automatically in the X and Y axes at optimum speed to cut kerfs in all the streets of the wafer.

23 Claims, 14 Drawing Figures

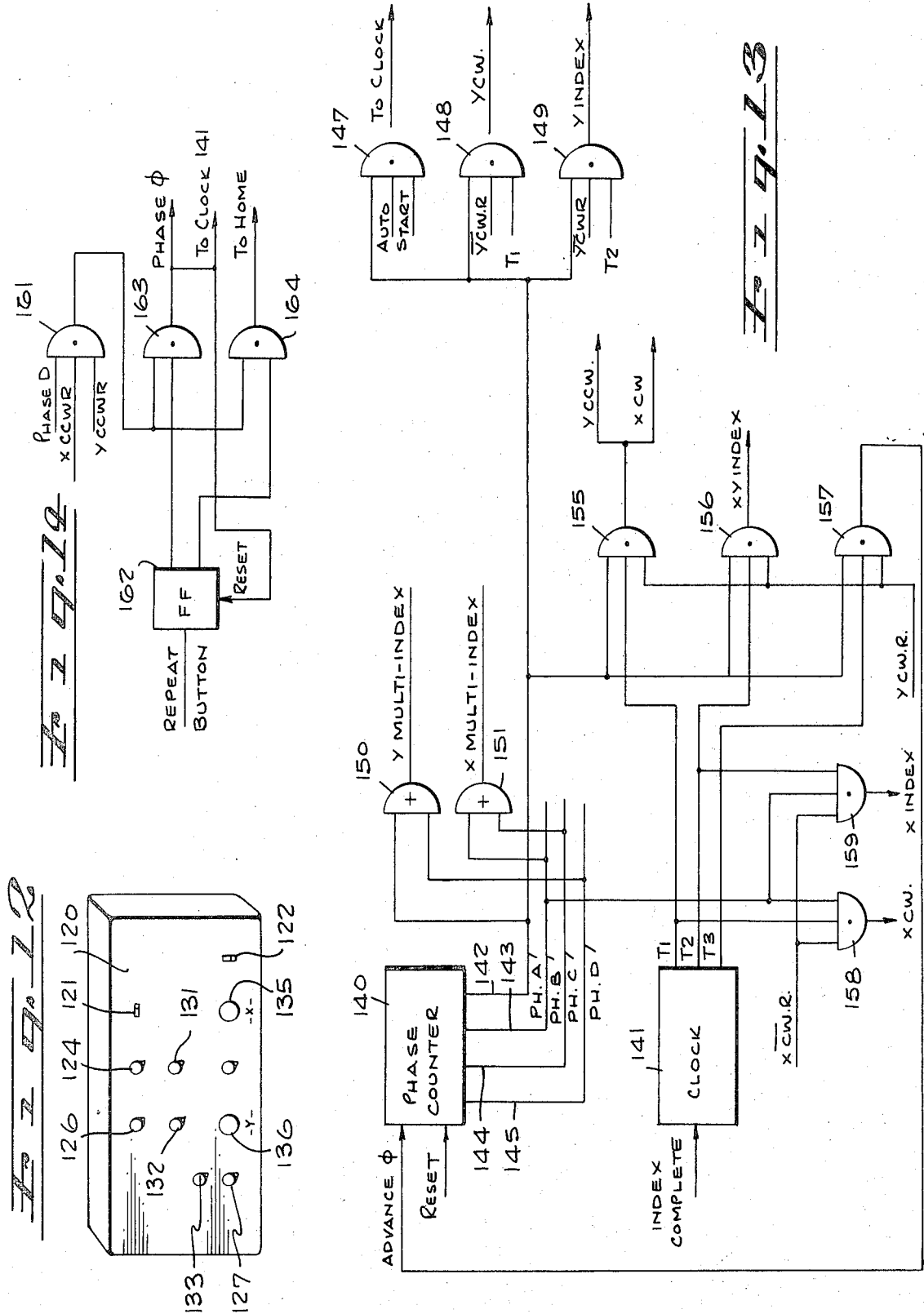

LASER SCRIBER CONTROL SYSTEM

BACKGROUND OF THE INVENTION

1. Field of the Invention

The present invention generally relates to a motion control system and, more particularly, to a system for scribing or cutting kerfs in a wafer on which microelectronic circuits are deposited to facilitate the separation of the individual circuits from one another.

2. Description of the Prior Art:

At present in the manufacturing of microelectronic circuitry a large number of such circuits are deposited on a single wafer. Generally the circuits are deposited with spaces between them. To separate the individual circuits from one another it is necessary to scribe or cut kerfs in the wafer in the spaces between them. To obtain optimum cutting performance, the cutting apparatus or system should be one which is capable of high cutting speed, short wafer set-up time and high accuracy to minimize cutting cost and maximize the number of useful circuits, undamaged by the cutting operation. Although various cutting systems have been developed, none seems to possess all the desired characteristics.

OBJECTS AND SUMMARY OF THE INVENTION

It is a primary object of the present invention to provide a new improved cutting system.

Another object of the invention is to provide a system for scribing kerfs in a wafer between micro-electronic circuits deposited on the wafer at relatively high speed and with a high degree of accuracy.

A further object of the invention is to provide a scribe system which is simple to set up and which automatically cuts kerfs in spaces between a plurality of microelectronic circuits deposited on a wafer to facilitate the separation of the circuits from one another.

These and other objects of the present invention are achieved by providing a scribe system comprising a laser which provides a radiating beam in a fixed direction, generally vertical, toward a wafer-supporting plate or chuck. The chuck is movable in a horizontal plane so that as it moves, a kerf is cut in the wafer, supported thereon, at those points struck by the laser beam. The movement of chuck is under the control of a control unit. Limit switches are also incorporated to sense the travel of the chuck beyond predefined boundaries. These limit switches provide signals to the control unit which after manual wafer set-up, automatically controls the motion of the chuck in a sequence of motion modes from a set start point. In these modes the chuck is automatically moved in a fixed pattern from the start point to an end point. While moving in this pattern all spaces between the wafer circuits pass in the path of the laser beam which cuts kerfs therein to thereby facilitate the separation of the circuits from one another.

The novel features of the invention are set forth with particularly in the appended claims. The invention will best be understood from the following description when read in conjunction with the accompanying drawings.

BRIEF DESCRIPTION OF THE DRAWINGS

FIG. 1 is a simplified block diagram of the present invention;

FIG. 2 is a top view of an array of circuits deposited on a wafer, shown in FIG. 1;

FIG. 3 is a diagram useful in explaining several phases of a multiphase scribing pattern in accordance with the teachings of the present invention;

FIG. 4 is a diagram useful in describing another scribing phase;

FIG. 5 is a simplified block diagram useful in further describing the invention;

FIG. 6 is a diagram useful in describing scribing boundaries employed in the present invention;

FIGS. 7 and 8 are a block diagram and boundary diagram respectively, useful in describing the control of the directions of stepping of motors as a function of boundary crossings;

FIGS. 9 and 10 are diagrams useful in explaining an alignment phase of the present invention;

FIG. 11 is a block diagram of motor control circuitry associated with each of the motors;

FIG. 12 is an isometric view of a control panel; and

FIGS. 13 and 14 are block diagrams of the type of logic circuitry employed in the control unit of the present invention.

DESCRIPTION OF THE PREFERRED EMBODIMENTS

Attention is first directed to FIG. 1 wherein numeral 12 designates a laser which directs a beam 14 in a vertical direction toward a chuck 15 on which a wafer 16 is supported. The chuck is movable in a horizontal XY plane by an X-Y drive unit 18. The system further incorporates a plurality of devices 19, which sense the position of the chuck with respect to the axis of beam 14 and provide limit control signals whenever the chuck's position is beyond selected boundary lines. These limit control signals are supplied to a control unit 20 which controls the drive unit 18 to in turn control the motion of the chuck in the XY plane. Briefly, after proper wafer positioning, accomplished in a manner to be described hereafter, the chuck's motion is automatically controlled to subject all spaces between all the circuits on the wafer to the laser beam. The beam cuts kerfs in the wafer which enable the circuits to be separated from one another. Devices 19 may be limit switches or electronic circuits, as will be apparent from the following description. Initially, they will be referred to as limit switches.

FIG. 2 is a top view of wafer 16. It is shown including an array of circuits designated by squares 22 which are surrounded by spaces, often referred to as streets. In FIG. 2, the horizontal streets are designated by S1–S5 and the vertical streets by P1–P5. The streets in each direction are parallel to one another. The distance between the centers of adjacent streets will be referred to as the index distance. In FIG. 2, the index distances in both the horizontal and vertical directions are equal although in practice, they may differ, depending on the geometry of the circuits 22.

In accordance with the teachings of the present invention drive unit 18 includes two closed loop bidirectional stepping motors. One motor, hereafter referred to as the X motor, moves the chuck and therefore the wafer in the X axis, designated in FIG. 2 by arrow X. Thus, when the wafer is properly aligned, so that the horizontal streets S are aligned with the X axis and the beam strikes at the middle of one of the horizontal streets, as represented by dot 23, if motor X is activated, the wafer is moved in the X axis and the beam traverses one of the horizontal streets. Since the X motor is bi-directional, the traversing can be in either direction along the X axis, depending on the direction of rotation or stepping of the motor.

The second motor in the drive unit, hereafter referred to as the Y motor, moves the chuck and the wafer in the Y axis. When the wafer is properly aligned, so that the S streets are aligned in the X axis and the beam intersects a vertical street P, when the Y motor is activated the beam traverses the vertical street. Assuming that the beam strikes the wafer at point 23 at the intersection of streets S3 and P3, and the wafer is properly aligned, if the X motor rotates in one direction, e.g., clockwise ($cw$), the wafer is assumed to be moving to the right so that the beam traverses street S3 toward the left end of the wafer, while traversing S3 to the right when the X motor rotates counter-clockwise ($ccw$) and the wafer is moved to the left. Likewise street P3 is traversed either up (wafer moving down) when the Y motor rotates $cw$ or down (wafer moving up) when the Y motor rotates $ccw$.

Each of the X and Y motors has built in deceleration capabilities and operates as disclosed in U.S. Pat. Nos. 3,463,985; 3,476,996 and 3,482,155. Briefly, each motor rotates or steps to move the wafer one index distance in a direction depending on the control signals supplied thereto. In practice the control signals supplied to the control unit of each motor are a direction signal and an index signal. When indexed, a number corresponding to the desired index distance is loaded in a counter of the motor's control unit. Based on the direction signal the motor steps a number of steps corresponding to the desired index distance. Upon completing the index distance the motor's control unit provides an index complete signal and it is ready to be indexed with a new index. Generally the control unit controls the motor's stepping speed or velocity to prevent overshooting the index distance. The motor's control unit may include means to respond to a multi-index signal in which case each index distance is stepped at full speed.

The control signals are supplied to the motors in the drive unit 18, by unit 20. The latter in a sense includes logic circuitry which together with the signals from the limit switches 19 generate control signals for the motors to move the wafer so that the beam traverses the streets in a predefined pattern.

Part of this pattern will be explained in connection with FIG. 3. Therein it is assumed that the wafer is properly aligned, i.e., that the horizontal streets are aligned with the X axis and that the beam at point 23 bisects a vertical street. The system, after alignment, is switched to an automatic (Auto) state or mode. As a result a first pattern phase, defined as phase A, is executed. In this phase the Y motor is driven cw with a multi-index signal. Thus the wafer moves down and the beam traverses the upper part of the wafer along a vertical street, as represented by line 25.

At the completion of each index distance the control unit 20 is provided with an index complete signal from the control unit of the Y motor. A clock is then activated to provide a sequence of timing signals and the duration of each signal is used for a different logic decision. These timing signals include a first timing pulse T1 during which a decision is made whether to change stepping direction. During a second timing pulse T2, a decision is made whether to supply an index to either or both motors, and during T3 the decision is made whether to change to a next pattern phase. Other timing pulses are generated but their description is not needed for a complete understanding of the invention. All of these decisions are made in a time less than that of a single motor step.

Since in the A phase a multi-index signal is supplied to the control unit of Y motor, it steps each index distance at maximum speed. When the wafer has moved down so that the beam now strikes a point on the wafer beyond a Y upper boundary line 27, as represented by point 28, an appropriate limit switch 19 provides a Y cw reverse (Y $cw$ R) control signal. Then when the index distance is completed at point 29, since the system is in phase A and line 27 was crossed, during T1 a decision is made to change the Y motor direction to ccw and to supply the X motor with a $cw$ direction signal. During T2 both the X and Y motors are indexed and during T3 a decision is made to change to phase B. As soon as the phase is changed to B, the multi-index signal is supplied to the X motor and not to the Y motor. Thus the wafer is moved up one index distance and is moved to the right. As each index distance is completed in the X axis, a new index is supplied to the X motor, and since the motor is supplied with the multi-index signal, it steps each index distance at full speed until an X left boundary line 30 is exceeded.

It should be stressed that since the Y motor was supplied with a multi-index signal it completed the index distance at point 29 at full speed, therefore it must first decelerate to zero before reversing direction to $ccw$. As a result point 29 is overshot. However, the motor accumulates a count representing the overshoot so that when it is loaded with one index distance in the $ccw$ direction, it first accounts for the overshoot and then moves the table up exactly one index distance from point 29.

It should again be stressed that overshooting occurs only when the multi-index signal is supplied causing the motor to complete each index at maximum speed. When the motor is indexed without the multi-index signal it steps one index distance without overshooting since its stepping speed is controlled to be substantially zero when the index distance is completed. In the present invention to optimize scribing speed, multi-index signals are used and the resulting overshoots are accounted for without any loss of accuracy, as will be described hereafter in detail. Thus maximum scribing speed is achieved while maintaining optimum accuracy.

When the X left boundary line 30 is crossed, one of the limit switches provides an X cw reverse (X $cw$ R) signal and then when the last index distance is completed, as represented by point 32, the system automatically switches to a next phase C. In the first part of this phase, the X motor is commanded with a $ccw$ direction and a multi-index signal. Thus the X motor first decelerates to zero and thereafter accelerates in the ccw direction, moving the wafer to the left so that the beam in essence traverses the wafer to the right in the X direction along a horizontal street, as represented by line 34. In FIG. 3, the dashed line 35 to the left of point 32 represents the wafer surface exposed to the beam due to motor overshooting as the motor decelerates from its cw direction to zero before it assumes a *ccw* direction of stepping.

When the wafer is pulled to the left so that a X right boundary line 40 is crossed, a X *ccw* reverse (X *ccw* R) signal is supplied by one of the limit switches. Then, when the last index distance travel is completed, represented by point 41, the control unit supplies a X *cw* command to the X motor causing it to decelerate and reverse direction from *ccw* to *cw*. Also the control unit supplies a one index distance signal to the Y motor 20 and a ccw direction signal thereto. As a result, the wafer moves up one index distance by the Y motor, as represented by line 42. This line is curved rather than straight down since while the wafer moves on index distance in the Y axis, the X motor, while decelerating, moves it in the X axis. When the X motor's direction is reversed to *cw*, the wafer is moved to the right, and beam traverses the next horizontal street leftward as represented by line 43. When boundary line 30 is crossed, once more a X *cw* R signal is again provided by a limit switch. Then when point 44 is reached at the end of an index distance, since the system is in the C phase, the Y motor is stepped *ccw* one index distance, as represented by line 45 and the X motor's direction is reversed. After the deceleration of the X motor, it rotates ccw to expose the wafer to the beam along line 46.

In the C phase this process repeats itself, causing the beam to traverse horizontal streets, with successive streets being traversed in opposite directions, until a point 50 is reached which is beyond boundary line 30 and a Y down boundary line 52. When a point is reached in this region (beyond line 52), a Y ccw reverse (Y ccw R) signal is provided. When point 50 is reached, the limit switches provide both a X *cw* R and a Y *ccw* R signals and since the system is in the C phase, it switches to a next phase D.

Figure 4:
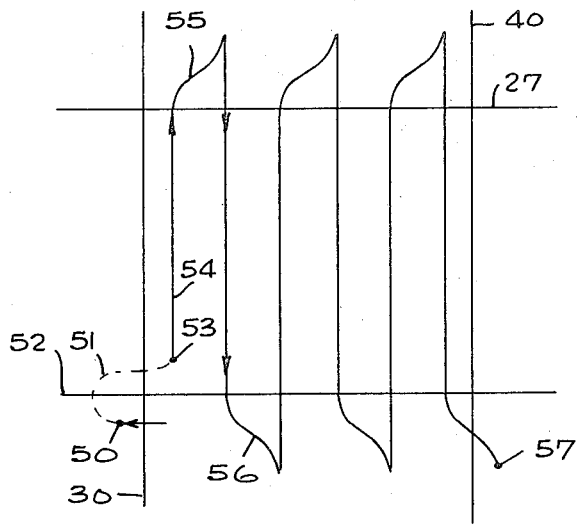

Briefly in this phase a pattern, similar to that performed in the C phase, is executed, except that in the D phase successive vertical streets are traversed, as shown in FIG. 4. Phase D starts from point 50. At this point the X motor is single indexed in the ccw direction and Y motor in the *cw* direction. The X motor which is at full speed in the *cw* direction at point 50 will first decelerate and then move ccw. Since the Y motor is also moving *ccw*, the first portion of the D phase motion is as described by line 51. In phase D multi-indexing is controlled in the Y axis and at the completion of the first index at point 53, successive indexing is initiated, giving rise to a Y motion as shown by line 54. The X motion will stop early along the 51-54 line well before the edge of the wafer is encountered.

When boundary 27 is crossed, and an index distance is completed, the rotation of the Y motor is reversed to *ccw* and the X motor is stepped one index distance in the *ccw* direction, as represented by line 55. Then when boundary line 52 is crossed, the Y motor direction is reversed to *cw* and the X motor is stepped again one index distance in the *ccw* direction, as represented by line 56. Phase D continues until a point in the area beyond boundaries 40 and 52, such as point 57, is under the beam. Since this point is beyond both boundaries and the system is in the D phase, the control unit 20 provides an End-of-Pattern signal, which activates the motors to move the chuck to a fixed load-unload position away from the beam. This position is referred to as the Home position. It should be stressed that in phase D a multi-index signal is supplied to the Y motor so that each index distance in the Y axis is completed at an optimum stepping speed to thereby minimize scribing time in phase D.

From the foregoing it is thus seen that once the wafer is properly aligned, the wafer is automatically moved in a multiphase predetermined pattern whereby the beam traverses each of the horizontal and vertical streets. In the particular pattern the first two phases A and B are used to locate a point, such as point 32. Thereafter, the pattern's phase C is used to traverse all the horizontal streets, automatically followed by the successive traversing of the vertical streets in phase D. The wafer is moved in an XY plane by two closed loop stepping motors. The position of the wafer relative to fixed boundary lines is sensed by limit switches which provide control signals which are in turn used in controlling the directions of rotation of the two motors. A control unit or system uses these control signals and based on its logic it automatically controls the pattern to follow one phase after another until the pattern is completed. Actually, based on the phase of the pattern and the control signals, the control system controls the directions of rotation of the two motors and the number of index distances which each is to rotate or step. It should be stressed that the boundary lines need not be at an integral number of index distances from any of the streets, since the decisions are made not at the instant boundary lines are crossed but rather at the completion of an index distance after the crossing of a boundary line. For example, the decision to switch from phase A to phase B does not occur when the beam crosses boundary line 27 at point 28 but rather when point 29 is reached, which is at a distance which is an integer multiple of the Y index distance. Similarly, the decision to switch to phase C occurs at point 32 which is at the end of an X index distance.

It should be pointed out that in the present invention each boundary line is crossed when one of the motor steps at full speed, i.e., in response to a multi-index signal, while the other motor is not rotating or stepping. If desired the decision to activate the non-stepping motor may be made as soon as a boundary line is crossed, rather than after the completion of an index distance by the other motor. For example, herebefore it was assumed that in the C phase the Y motor is stepped one index distance only after a boundary is crossed, such as boundary 40, and after the index distance is completed by the X motor as represented by point 41 in FIG. 3. If desired, the decision to index the Y motor may be made upon crossing boundary 40, while the decision to index the X motor will be made only when its index distance is completed. In such a case the pattern beyond boundary 40 will be like that represented by line 42*a*. The point at which the X index distance is completed is represented by point 41*a*. Similarly, in phase D the decisions to index the X motor to step one index distance in the *ccw* direction may be made each time either boundary 27 or 52 is crossed rather than after the completion of the index distance in the Y axis beyond either of these boundaries.

Figure 5:
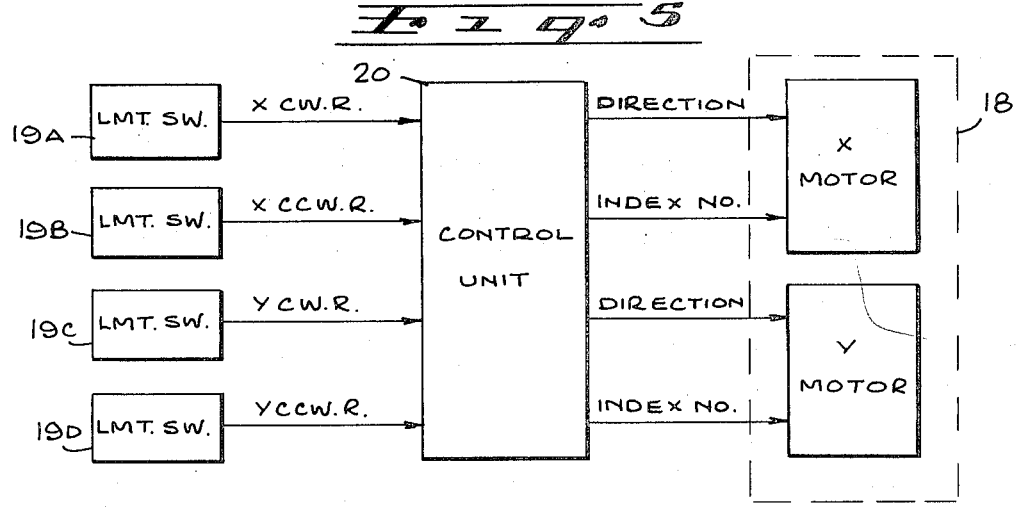

Attention is now directed to FIG. 5 which is a simple block diagram useful in summarizing the connections between the limit switches, the control system 20 and the drive unit 18. The four switches are designated by 19A, 19B, 19C and 19D, which provide the X *cw* R, the X *ccw* R, the Y *cw* R and the Y *ccw* R, control signals when boundary lines 30, 40, 27 and 52 are crossed. These control signals are supplied to the control system. Therein, based on the present pattern phase decisions are made whether to change to a next phase, and the direction and indexing signals to be supplied to the X and Y motors of drive unit 18. Each time a motor is indexed it steps until an index distance is completed. If a multi-index signal is not supplied, the motor's speed is controlled so that at the completion of the index distance, the motor's speed is effectively zero. If however a multi-index signal is supplied the index distance is stepped at full speed.

Figure 6:
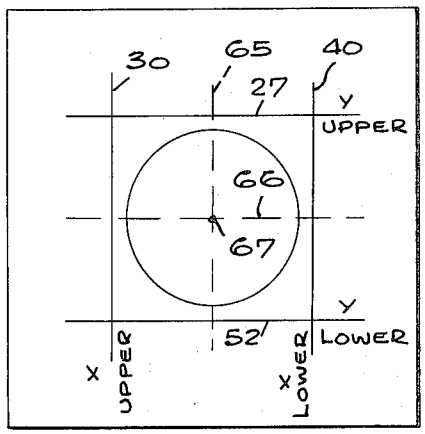

In practice the spacings between the boundary lines in the X and Y axes are chosen as a function of the wafer size. In one embodiment actually reduced to practice, the field of travel of the chuck from a Home position is 5 inches in each axis, as shown in FIG. 6 Therein, the boundary lines 27, 52, 30 and 40 are also designated by Y upper, Y lower, X upper and X lower about a wafer 1-½ inches in diameter. The dimensions of the distances of the boundary lines from the Home position are given in the following Table:

| Wafer Size | DISTANCE FROM HOME | | Square |
|---|---|---|---|
| | to lower | to upper | |
| | 1.7 | 3.3 | 1.6 |
| 1½" | 1.6 | 3.4 | 1.8 |
| | 1.5 | 3.5 | 2 |
| | 1.3 | 3.7 | 2.4 |
| 2¼" | 1.2 | 3.8 | 2.6 |
| | 1.1 | 3.9 | 2.8 |
| | 0.8 | 4.2 | 3.4 |
| 3¼" | 0.7 | 4.3 | 3.6 |
| | 0.6 | 4.4 | 3.8 |

As seen three different size squares or fields defined by the distances between the boundary lines are provided for each size wafer, any one of which can be selected for the particular wafer on the chuck.

Figure 7:
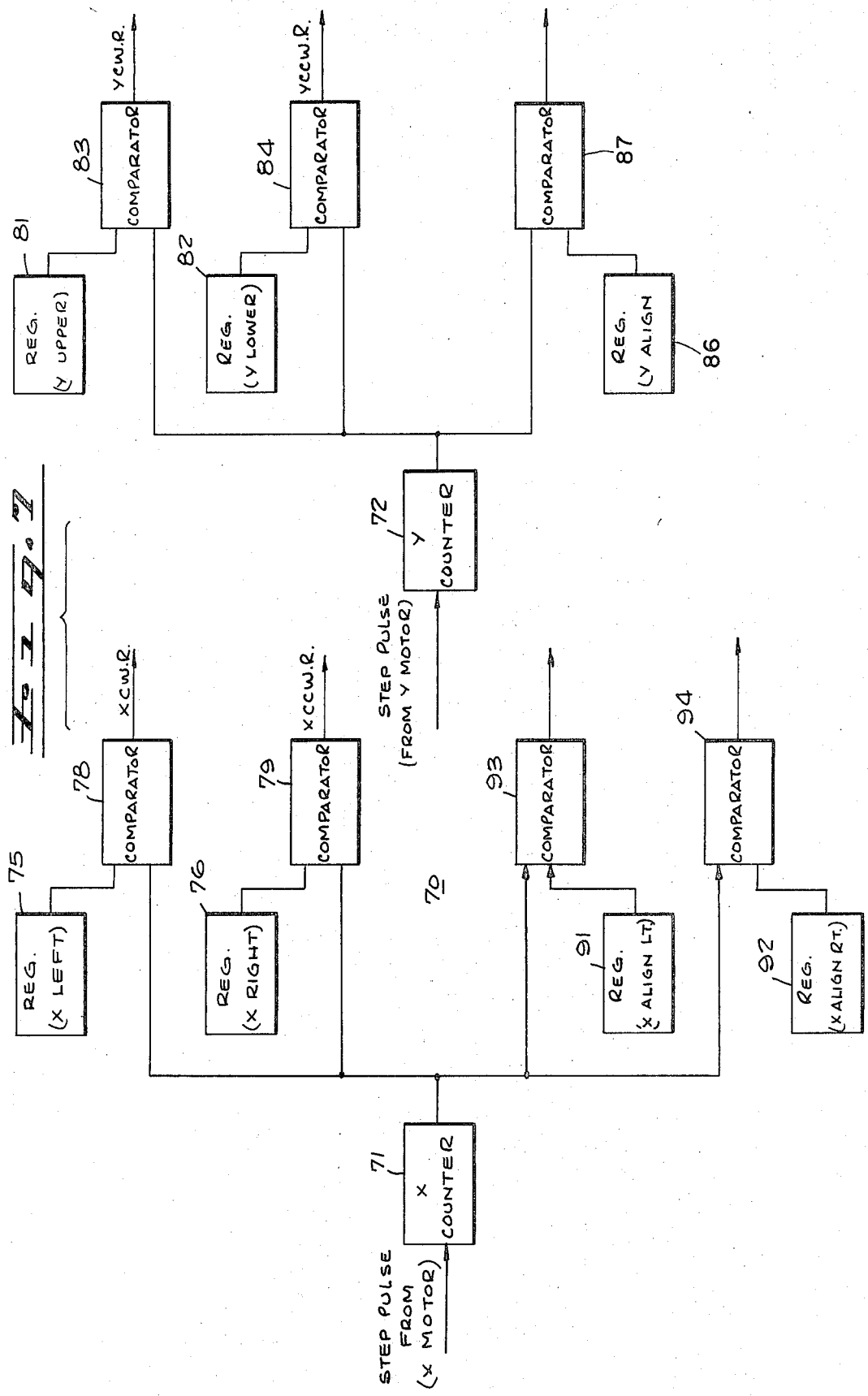

Although herebefore it has been assumed that the boundaries are sensed by limit switches, such as switches 19A, 19B, 19C and 19D, such an arrangement represents only one possible implementation. The boundaries may be sensed electronically to provide the necessary control signals. Such an embodiment will now be described. Therein the control system 20 includes a square limit detector 70 shown in FIG. 7, which will be described in connection with FIG. 8. The detector 70 includes a bidirectional X counter 71 and a bidirectional Y counter 72. The counter 71 is incremented each time the X motor steps one step in the ccw direction resulting in chuck movement to the left and is decremented each time the motor X steps one step in the cw direction, i.e., the chuck moving to the right. The Y counter 72 is similarly incremented by step pulses from the Y motor.

Let the Home position be defined as 0,0 position, the center of the chuck under the laser beam as 5,000, 5,000, where each unit represents one step of the motors, and the maximum travel in each direction as 10,000 steps. Thus when the chuck center is under the beam the count in each of counters 71 and 72 is 5,000. The detector 70 includes a separate register and a comparator for each boundary line. The register is set to hold a number which corresponds to the distance of the boundary in terms of steps from the Home position. For example, registers 75 and 76 are loaded with numbers depending on the desired locations of lines 30 and 40 from 0 along the X axis. Assuming that the desired square is 5,000 steps or 2,500 on either side of the center, register 75 is loaded with a number 7,500 and register 76 with the number 2,500. The count of counter 71 is compared with that of register 75 by comparator 78. Whenever the count of the counter exceeds 7,500, the comparator provides an output, indicating that line 30 was crossed. This output represents the X cw R signal. Similarly a comparator 79 compares the count in the counter 71 with the content of register 76 and provides an output, representing X ccw R, whenever the count in the counter falls below 2,500. An analogous arrangement, consisting of registers 81 and 82 and comparators 83 and 84 are used in connection with Y counter 72. For a square of 5,000 steps the registers are set to 7,500 and 2,500 respectively. Thus comparator 83 provides the X cw R when the count in counter 72 exceeds 7,500 indicating the crossing of line 27 and comparator 84 provides Y ccw R when the count in the counter is less than 2,500 indicating the crossing of line 52. Clearly for different wafer sizes different size squares may be chosen by merely changing the initial settings of registers 75, 76, 81 and 82. However, once set their settings are not changed until the wafer scribing is completed.

Figure 2:
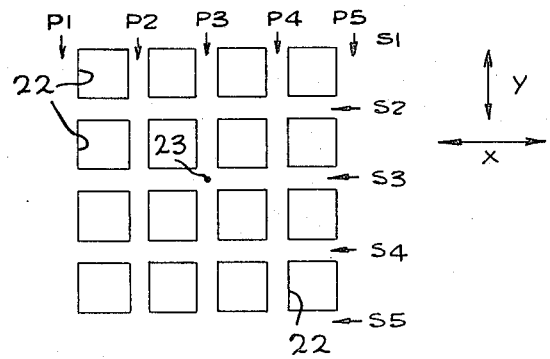

It should be appreciated that for proper operation of the system before automatic scribing can take place, the wafer on the chuck must be properly aligned so that the horizontal and vertical streets are properly aligned with the X and Y axes respectively. Also before scribing the chuck should be positioned so that the laser beam strikes at the center of an intersection between streets, such as at point 23 in FIG. 2 or at least the center of a vertical street. Such alignment is accomplished in the present invention by a novel alignment arrangement.

Briefly, the wafer is loaded on the chuck at the Home position. Then the chuck is moved so that its center is aligned with the laser beam. A microscope with cross hairs 65 and 66 (see FIG. 9) intersecting at point 67 is provided. The wafer is moved back and forth along the X axis between alignment boundaries. Only when the horizontal streets are perfectly aligned with the horizontal hair 66 of the microscope eye piece, is the wafer in proper X alignment. If this is not the case, the lines, defining the horizontal streets, seem to oscillate above and below the horizontal hair. This is corrected by rotating the chuck about its center, by means of an appropriate manually activated wheel, hereafter defined as θ alignment until the horizontal streets are perfectly aligned in the X axis. Thereafter, the chuck is adjusted in the X axis by pulses supplied to the X motor by means of manually actuated switches until the microscope's vertical hair 65 bisects one of the vertical streets.

Figure 9:
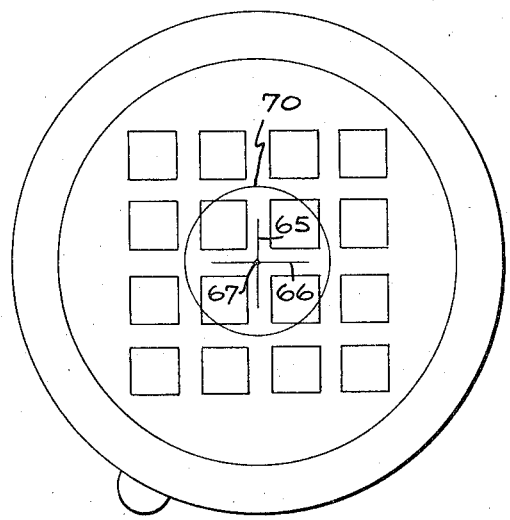

For proper alignment it is not necessary for the horizontal hair 66 to bisect a horizontal street. All that is necessary is that the hair which is aligned in the X axis be parallel to the horizontal streets. The system however provides a manually actuatable switch to supply pulses to the Y motor to move the chuck up or down to align the wafer so that a horizontal street is bisected by the horizontal hair 66. Proper alignment is shown in FIG. 9 in which circle 70 represents the microscope's eye piece and lines 65 and 66, are shown bisecting vertical and horizontal streets, respectively.

Figure 10:
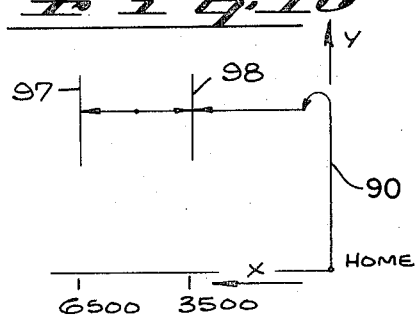

As previously stated, the alignment is achieved by moving the wafer back and forth in the X axis between alignment boundaries. These boundaries may be the X boundaries 30 and 40. However, to reduce alignment time it is preferred to select alignment boundaries which are closer together than the X boundaries, needed for the scribing operation. The selection of alignment boundaries as well as the movement of the chuck to the field center may be accomplished in several different ways. For example, the detector 70 (see FIG. 7) may further include a register 86 and a comparator 87 which are activated during alignment (in the Align mode) while registers 81 and 82 and comparators 83 and 84 are deactivated. The register 86 is loaded with a selected number, e.g., 5,000. When the Align button is pressed the Y motor rotates cw moving the chuck from the Home position along the Y axis. When the Y motor traverses half the field, i.e., the count in counter 72 reaches 5,000, comparator 87 provides a stop signal to the Y motor and a *ccw* direction signal to the X motor. Consequently the chuck moves toward the field center or laser beam. The path of the chuck is represented by line 90 in FIG. 10. The detector 70 may further include two additional registers 91 and 92 and comparators 93 and 94. In the Align mode these replace the registers 75 and 76 and comparators 78 and 79. Registers 91 and 92 store numbers which represent the left and right alignment boundaries, represented in FIG. 10 by lines 97 and 98. Thus when line 97 is reached the direction of the X motor is changed from *ccw* to *cw* and when line 98 is reached, the direction is reversed from *cw* to *ccw*. Thus the chuck moves at full speed back and forth between these boundaries until the horizontal streets are perfectly aligned with the X axis. The distance between the alignment boundaries is controlled by the numbers stored in registers 91 and 92. In FIG. 10 they are assumed to be 6,500 and 3,500 respectively for an alignment distance of 3,000 units.

The control system 20 includes Start and Stop buttons. When the system is in the Align mode, the scanning in the X axis, i.e., the movement of the chuck back and forth in the X axis may be stopped and restarted by pressing these buttons. Once the horizontal street alignment is achieved the motors are activated by pulses supplied from manual switches of the control system 20 to position the cross hairs at an intersection of two streets, as shown in FIG. 9.

From the foregoing description it should thus be appreciated that the system of the present invention provides for alignment as well as automatic scribing of the wafer. Optimum scribing speed is achieved since the scribing of each index distance along a street is done with the motors stepping at full speed in response to the multi-index signal. When an index distance is completed beyond a boundary line, the motor's direction is reversed and the motor is indexed for travel in the opposite direction without having to wait for the motor to return to the completed indexed distance, due to any overshoot.

Figure 11:
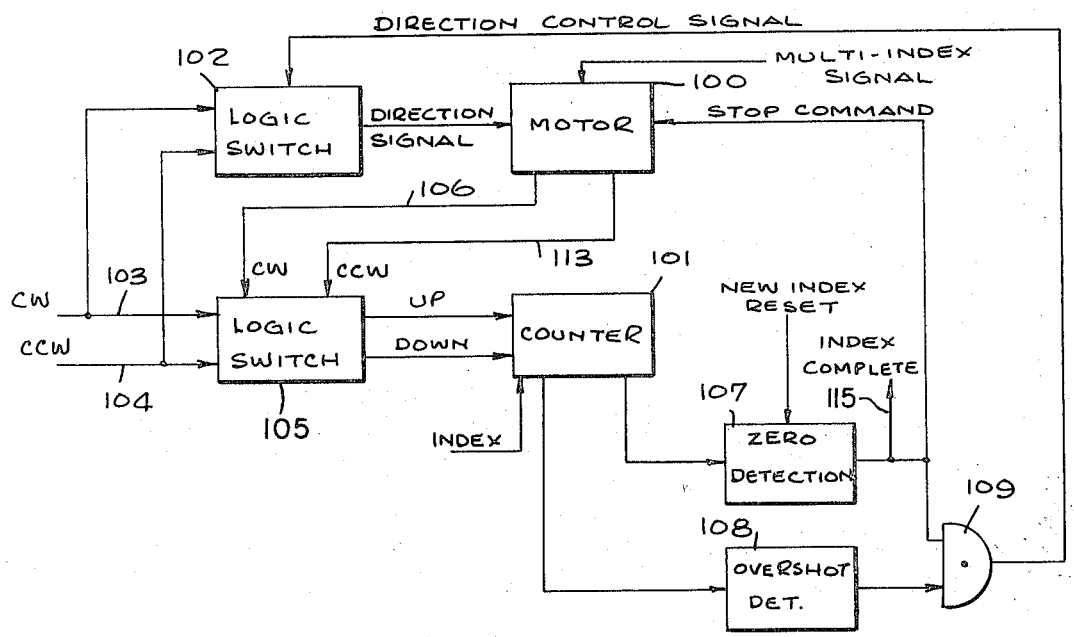

The manner in which each motor is controlled so that it is not necessary to wait until the motor returns to a completed index before loading it with a new index for travel in the same or opposite direction may be understood in connection with FIG. 11. Therein, motor 100 represents a typical motor such as either the X or Y motors. The rest of the circuitry represents motor control circuitry, which includes a counter 101. Whenever the motor is indexed the counter is loaded with an index number representing the number of steps of an index distance, e.g., 099. The motor is also supplied with a direction signal through a logic switch 102. The direction signal is assumed to be cw when the direction signal is applied to line 103 and ccw when applied to line 104. These lines are also connected to a logic switch 105. Assuming the commanded direction to be cw, the motor steps in the cw direction and for each step of the index distance it supplies a step pulse on the cw line 106 to logic switch 105. Since the motor steps in the desired direction, each step pulse decrements the counter. When the count reaches zero, indicating that the motor completed the index distance, the all zero state (000) of counter 101 is detected by a zero detector 107 which supplies a stop command to the motor to stop, and an index complete signal to the control system 20. If the motor stops upon receiving the stop command no additional pulses are supplied to the counter and therefore, the zero state remains. It is changed when a new index command is supplied to the counter, reloading it with the index number.

In practice when the motor is not supplied with a multi-index signal it stops upon receiving the stop command since its velocity is controlled to stop at the end of the index distance. If however due to a multi-index signal causing the motor to step at full speed or due to any other reason at the end of the index distance, the motor speed is such that it does not stop upon receiving the stop command, it keeps stepping in the previously selected direction. Consequently the counter continues to be decremented beyond the count of zero. Thus the counter changes from the all zero state to a full count, e.g., 999 and lower. This is sensed by the overshoot detector 108. Its output together with that of detector 107 are ANDed in an AND gate 109 which provides a direction control signal to switch 102. This signal is supplied only when an index was completed as detected by detector 107 and overshooting occurs, as detected by detector 108. This signal causes switch 102 to supply to the motor 100 a direction signal which is opposite that of the last completed index, i.e., ccw in the present example. When the motor finally changes direction the stepping pulses from motor 100 are supplied to switch 105 on the ccw line 113 to indicate that the motor is now stepping in a direction (*ccw*) opposite the original direction (*cw*) of the last index. Consequently, switch 105 supplies pulses to counter 101 which increment it, until the count in counter 101 is again zero thereby indicating that the overshoot was eliminated. In practice switch 105 supplies pulses which decrement the count when the motor steps in the desired direction, such as cw in the present example and further supplies pulses to the counter to increment its count, whenever the direction of rotation of the motor is opposite that for the last index distance. The latter case occurs whenever the motor steps to eliminate overshoot.

The foregoing may best be explained in connection with a specific example. Let it be assumed that the counter 101 is loaded with an index of 099 for a cw direction on input line 103. Switch 102 supplies a cw direction signal to motor 100 and the latter steps in the cw direction, supplying cw direction pulses on line 106. Since the motor steps in the desired direction each stepping direction pulse from line 106 decrements counter 101. After 99 pulses, i.e., after an index distance was stepped, the count in counter 101 is zero and therefore detector 107 is activated. It supplies an index complete signal on line 115 to indicate that the motor is ready for a new index. It also supplies a stop command to motor 100.

If the motor stops no additional stepping direction pulses are supplied thereby. Thus the count in counter 101 remains zero. Assuming however that the motor due to its acceleration does not stop upon receiving the stop command, but rather continues to step in the cw direction, the counter 101 changes from all zero state of 000 to 999 and lower counts. This is detected by detector 108 which activates AND gate 109 which in turn activates switch 102 to change the direction of rotation of motor 100 from cw to ccw. Let it be assumed that until the motor changes from cw to ccw, 100 steps were overshot. Thus the count in counter 101 is 900. As the motor changes from cw to ccw, the stepping direction pulses are now supplied on line 113. Since the indicated direction for the last index was cw, and the motor steps ccw, switch 105 supplies each stepping direction pulse to increment the counter. Thus as the motor steps ccw, the count is incremental until it reaches again an all zero state thereby disabling detector 108 and the motor stops. Thus the overshoot is corrected. It should be noted that when the motor steps to eliminate the overshoot, it does so at a slower stepping rate so that it eliminates the overshoot without producing an overshoot in the opposite direction.

As previously stated the system is operated so that once an index is completed, a new index and a direction are supplied to the motor control circuitry, before the motor steps a single additional step. In the multi-index mode the motor is stepped at maximum speed and is supplied with a new index after each index is completed.

To optimize scanning speed the motor control system is capable of indexing the motor for the opposite direction without having to wait for the motor to eliminate any overshoot in the original direction. This aspect may best be described in connection with a specific example. Again let it be assumed that the motor is indexed in the cw direction in a multi-index mode and that after completing a certain index, due to a particular crossing of a boundary, a decision is made to change the direction of the motor to ccw. This situation arises when the X motor steps cw in the B phase and after crossing line 30 (see FIG. 3) and the index is completed at point 32, a decision is made to switch to phase C in which the X motor is switched to ccw to move the wafer to the left as represented by line 34. As will be appreciated from the following description in the present invention, it is not necessary to wait for the X motor to return to point 32, i.e., to eliminate the overshoot 35 before it is switched to step in the ccw direction. The change of direction is made once point 32 is reached and the overshoot is accounted for automatically.

Let us assume that the motor reaches point 32 at full speed and that before an additional step is made in the cw direction, the X motor is indexed and commanded to step ccw. Thus counter 101 is loaded with an index, e.g., 099, and the direction command of ccw is supplied on line 104. The motor however due to its full speed does not stop at point 32 but rather overshoots in the cw direction. Let us assume that the overshoot is 20 steps. During the overshoot the pulses from the motor are cw on line 106 and since the direction command is for ccw, switch 105 uses each of these 20 pulses to increment the count so that when the motor finally stops the count in counter 101 is 119. Then the motor starts at full speed in the ccw direction. Since now the pulses from the motor are on ccw line 113, the switch uses each of these pulses to decrement the count of 119. The motor is free to step at full speed in the ccw direction. In practice it reaches point 32 after having stepped 20 pulses representing the overshoot. However, no stopping occurs thereat since the count in counter 101 is now 099. The motor continues to step 99 steps in the ccw direction until it completes an index in the ccw direction and the counter reaches the zero count.

It is thus seen that in the present system the motor is controlled so that it can index in one direction at full speed and maintain the full speed in the opposite direction. It is only when the motor is commanded to step in a direction opposite of its previous stepping direction that its velocity is reduced. But once it comes to a full stop it assumes the full speed in the opposite direction.

Figure 3:
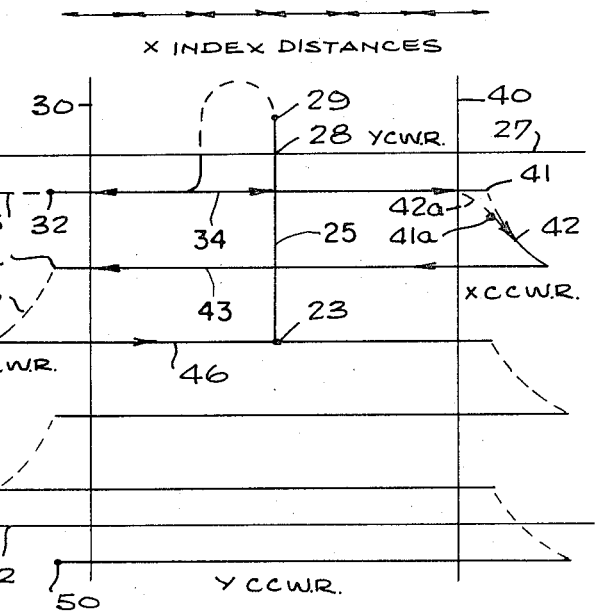

Thus in FIG. 3 the motor steps at full speed cw until it reaches point 32 at which time the X motor is ordered to step ccw. Its speed is reduced until it stops at the end of the overshoot 35 at which time it is free to resume full speed in the ccw direction.

As is appreciated the various circuits here-before described are included in the control system 20 except for the motors and their control circuitry which are included in the drive unit 18. The control system further includes logic circuitry which responds to the various control signals herebefore described, to control automatically the motor of the chuck for wafer scribing as well as during alignment.

It is appreciated by those familiar with the art that various known logic techniques may be employed to control the chuck to move in the previously outlined pattern both in the alignment and actual scribing modes of the operation. The control system is provided with external manually actuatable switches and buttons which in turn activate the control system to operate in the desired mode. FIG. 12 is an isometric view of the front panel 120 of the control system 20 of an embodiment actually reduced to practice. Mounted on the panel are Manual-Auto (MAN/AUTO) switch 121 and a vacuum on-off switch 122. Except when the automatic scribing is performed switch 121 is in the Manual position. The wafer is held securely on the chuck by vacuum which is produced when switch 122 is in the on position. The panel further includes Start and Stop buttons 124 and 125, an Align button 126 and a Home button 127. Buttons 124, 126 and 127 have respective lights 131, 132 and 133 associated therewith.

When the chuck is in the Home position light 133 is illuminated. The Align mode is initiated with switch 121 in the Manual position and by pressing Align button 126. During this mode light 132 is illuminated. Bi-directional paddle switches 135 and 136 are also provided. These are used to provide manual pulses to the motors to step them in the X and Y axes for the alignment of the cross-hairs of the microscope with the horizontal and the vertical streets during the Align mode. To stop the Align mode Stop button 125 is activated. To initiate the automatic scribing after alignment, the switch 121 is placed in the AUTO position and the Start button 124 is pushed. Thereafter the operation is completely automatic until the chuck returns to the Home position when light 133 lights up. At any point in either the Align or AUTO modes the operation can be stopped and restarted by pushing buttons 125 and 124.

In practice the control system 20 includes a counter whose output is used to define the various phases A, B, C and D. At the start of the AUTO mode its output represents phase A and each time a phase change is required it is clocked to define a subsequent phase. A clock is also included which provides pulses T1, T2 and T3 at the end of each completed index supplied thereto by the control circuitry of either the two motors. Such a phase counter is designated in FIG. 13 by numeral 140 and the clock by numeral 141. The counter 140 has four output lines, only one of which is true or high at any time. The lines 142–145 are high during phases A–D, respectively. When the system is in Align the counter is reset so that line 142 is high representing phase A. The counter is advanced by advance phase ($\phi$) pulses. The logic of the control system may include an AND gate 147 which provides a pulse to clock 141 when the MAN/AUTO switch 121 is in AUTO and the Start button 124 is pushed which is done at the start of the automatic scribing to resume phase A. Thus the clock provides the sequence of pulse T1, etc. At T1 an AND gate 148 provides a Y cw pulse to motor Y since the phase is A and the Y upper boundary 27 was not reached, and therefore the output of comparator 83 of the Y axis is false represented by Y cw R. At T2 the Y motor is indexed by AND gate 149. That is the counter 101 of the Y axis is loaded with the index number. Lines 142 and 145 are connected to an OR gate 150 which provides a Y multi-index signal to the Y motor when the system is in either phase A or D. A similar OR gate 151 provides a X multi-index signal to the X motor when the system is in either mode B or C. Consequently, during phase A the Y motor is repeatedly indexed in the cw direction and with a multi-index signal until boundary line 27 is crossed and Y cw R is true.

As shown in FIG. 13, three AND gates 155–157 control the change of phase from phase A to phase B and provide the signals for the scribing of phase B. Since the boundary line 27 was crossed during phase A at the completion of the last index distance by the Y motor, represented by point 29 in FIG. 3, the clock 141 is clocked to provide the timing pulses. During T1 gate 155 is enabled to provide a Y ccw direction signal to the Y motor circuitry and an X cw direction signal to the X motor circuitry. During T2 gate 156 is enabled to index both the Y and the X motors, and during T3 gate 157 is enabled to provide a change of phase signal to phase counter 140. Thus line 143 becomes true to indicate phase B. During phase B as long as line 30 was not crossed, i.e., X cw R, is false represented by X $\overline{cw}$ R during each T1 period gate 158 is enabled to provide the X motor circuitry with a X cw direction and during T2, gate 159 indexes the X motor.

The identical logic technique is employed for controlling the scribing during phase C and D as well as for changing between phases B and C and phases C and D. Since such logic design circuitry is obvious to those familiar with the art, particularly in light of the foregoing example, the added logic will not be described in any detail. It should be apparent that the end of phase D occurs when both boundaries 40 and 52 are crossed, represented by point 57 in FIG. 4. The logic includes an additional AND gate so that during phase D, when both X ccw R and Y ccw R are true, a command is given to drive the chuck to the Home position to end the scribing.

If desired, the system may include a Repeat button so that when the pattern is completed a decision is made automatically whether to repeat the scribing pattern before returning to the Home position. A simple logic arrangement for a single repeat is shown in FIG. 14. The end of the first pattern scribing is detected by gate 161. If a FF 162 is set by the activation of Repeat button, gate 163 is activated. It advances the phase counter 140 to phase A and clocks the clock 141 to provide the decision pulses T1, etc. It also resets the FF 162. Then when the end of the second pattern scribing is completed FF 162 is in a reset state. Thus gate 163 is not enabled and gate 164 is enabled to provide a To Home command. Clearly, if FF 162 is never set, i.e., no repetition is desired, gate 163 is never enabled so that after the first scribing pattern is completed, the chuck returns to the Home position. FF 162 can be replaced by a counter to provide any number of scribing repetitions. Each time a scribing pattern is coupled the counter is decremented by one until its count reaches zero. Then when the last scribing pattern is completed gate 164 is enabled to provide the Home command.

Herebefore the invention has been described in connection with an arrangement in which the X and Y boundaries, represented by lines 30 and 40, 27 and 52 respectively, define a square. Such an arrangement is employed whenever the circuits on the wafer occupy a square surface. However, if the circuits are deposited so that they occupy a circular area on the wafer, it may be desirable to provide boundaries defining a circular or octogonal pattern so that the scribing of the wafer outside the area occupied by the circuits is held to a minimum and thereby minimize scribing time.

Figure 8:
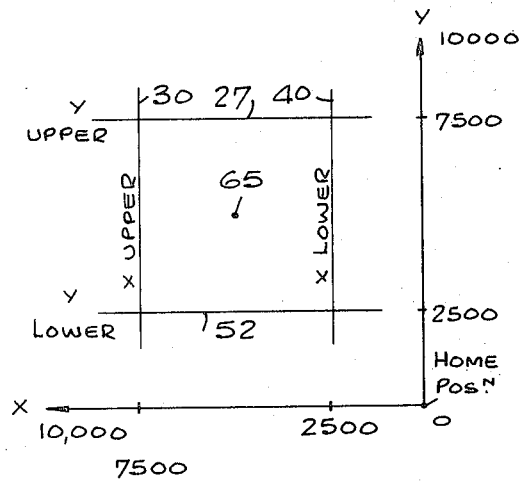

This can be accomplished quite easily in the present invention by controlling the contents of registers 75 and 76 (FIG. 7) to be a function of the count of counter 72, and those of registers 81 and 82 to be a function of the count in counter 71. Referring to FIG. 8 the system may be modified so that when the count in counter 72 is between 4,500 and 5,500, the registers 75 and 76 are set to 7,500 and 2,500, respectively. Then, for each 1,000 unit range in counter 71 above and below the 4,500 to 5,500 unit range, the contents of registers 75 and 76 are decreased and increased, respectively. As a result the direction between the X boundaries 30 and 40 would vary from 5,000 at the center to lower values as the count in counter 72 varies above and below the 4,500 to 5,500 unit range. Similarly, registers 81 and 82 may be controlled by counter 71 to provide other than two straight parallel Y boundaries 27 and 52.

The above described arrangement uses numerical techniques to provide an octogonal boundary pattern. Clearly if desired photoelectric or electromechanical devices or combinations thereof may be employed to provide such a boundary pattern.

There has accordingly been shown and described herein a novel scribing system. It includes a pair of indexable bidirectional stepping motors which move a chuck on which a wafer is supported in an XY plane so that a laser beam directed to the plane cuts a selected pattern in the wafer. The system includes motor control circuitry which enable each motor to step at full speed each index distance yet be commanded at the end of an index distance to reverse direction while the motor control circuitry account for any motor overshoot. This enables the wafer to be moved at optimum speed and accuracy so that the laser beam cuts kerfs in all horizontal and vertical streets separating circuits deposited on the wafer. The system further includes means for aligning the wafer prior to pattern scribing.

Although the invention has been described in connection with a chuck supporting a wafer to be scribed, it should be apparent that the invention has many other applications. For example, the invention can be employed to move a work piece in a controllable pattern in a XY plane with respect to a cutting member or the like, such as is the case in numerical control systems. It should further be appreciated that modifications and variations may readily occur to those skilled in the art and consequently it is intended that the claims be interpreted to cover such modifications and equivalents.

What is claimed is:

1. A scribe system for cutting kerfs in horizontal and vertical streets of a wafer having deposited in a planar surface thereon a plurality of spaced apart circuits with the spaces between the circuits defining said horizontal and vertical streets, the system comprising:

first means for providing a beam of energy in a direction transverse to the planar surface of the wafer, the energy being sufficient to cut a kerf in the planar surface of the wafer in said transverse direction;

movable means for providing a movement of the wafer relative to the first means in X and Y directions defining the planar surface of the wafer and respectively corresponding to the horizontal and vertical streets of the wafer; and control means for controlling the movement of said movable means in said X and Y directions to expose a preselected pattern on said wafer surface to said energy beam, said control means including first and second indexable bidirectional stepping motors, means for defining a sequence of movements of the wafer relative to the first means along the horizontal and vertical streets of the wafer and means for controlling said first motor to step the movable means at full speed in a first path in the X direction to move said movable means so as to expose a horizontal street between selected boundaries to said beam, means responsive to the position of the wafer in the X direction for controlling said first motor to step the movable means at full speed in an opposite path in the X direction upon the traversal of one of the selected boundaries by the wafer relative to the first means, means responsive to the position of the wafer in the X direction for controlling said second motor for stepping the movable means in the Y direction through a space corresponding to the space between adjacent horizontal streets during the operation of the first motor at full speeds in the X direction, means responsive to the position of the wafer for controlling the second motor to step the movable means at full speed in a first path in the Y direction to move said movable means so as to expose a vertical street between selected boundaries to said beam when the first and second motors have simultaneously moved the wafer past selected ones of the boundaries in the X and Y directions, means responsive to the position of the wafer in the Y direction for controlling said second motor to step the movable means at an opposite path in the Y direction upon the traversal of one of the selected boundaries by the wafer relative to the first means, and means responsive to the position of the wafer in the Y direction for controlling said first motor to step the movable means in the X direction through a space corresponding to the space between adjacent vertical streets during the operation of the second motor in moving the movable means at full speeds in the Y direction.

2. A system as recited in claim 1 wherein said control means includes first and second motor control means associated with said first and second motors, respectively, each of said motor control means including a bidirectional counter, each of said counters being indexable to store a count therein representing the number of steps of the motor associated therewith required for the wafer to traverse through an index distance dependent upon the distance between the boundaries in the direction of movement of said movable means controlled by the associated motor, means individually associated with each of the motors for receiving a signal representing the path of movement to be provided by that motor along the individual one of the X and Y directions, and means for decrementing the count in an associated one of said counters when the associated motor steps the movable means in the first path in the particular one of the X and Y directions and for incrementing the count in the associated counter whenever the associated motor steps the movable means in the opposite path in the particular one of the X and Y directions, and limit means responsive to the count in an associated counter for commanding an associated one of said motors to reverse its path in the particular one of the X and Y directions when the count in said associated counter exceeds a preselected value.

3. A system as recited in claim 2 wherein the limit means of each motor further includes means for providing an index complete signal to said control means to obtain a reversal of the associated motor when the count in said associated counter reaches said preselected value.

4. A system as recited in claim 1 wherein said control means includes first and second motor control means associated with said first and second motors respectively, said first motor control means controlling the motion of said movable means along the X axis of said XY plane and said second motor control means controlling the motion of said movable means along the Y axis of said XY plane, with said vertical streets being parallel to one another and perpendicular to the X axis and the horizontal streets being parallel to one another and perpendicular to the Y axis, each of said bidirectional counters being indexable to store a number representing the number of steps of the motor associated therewith required to move said movable means an index distance equal to the distance between adjacent streets, each motor control means further including first and second logic switches each responsive to a signal supplied thereto by said control means to control the path of movement of the movable means in the particular one of the X and Y directions, said first logic switch being further responsive to stepping pulses from the motor for decrementing the count of said counter when the motor steps the movable means in the first path and for incrementing the count of said counter when the motor steps the movable means in the opposite path, and said second logic switch reversing the path of the associated motor when the count in said associated counter exceeds the preselected value.

5. A system as recited in claim 4 further including means in said motor control means for providing to said second motor a signal to step the movable means each index distance along the Y axis during the cutting of the kerfs along the horizontal streets in accordance with the movements of the movable means at full speeds along the X axis and for providing to said first motor a signal to step the movable means each index distance along the Y axis during the cutting of the kerfs along the vertical streets in accordance with the movements of the movable means at full speeds along the Y axis.

6. A scribe system for cutting kerfs in a wafer along a first plurality of lines which are parallel to one another along an X axis, the spacings between adjacent lines defining a vertical index distance, and a second plurality of lines which are parallel to one another along a Y axis perpendicular to said X axis, the spacing between adjacent lines of said second plurality defining a horizontal index distance, the system comprising:
   means for cutting the kerfs on the wafer,
   movable means for providing a movement of the wafer relative to the cutting means;
   system means for controlling the motion of said movable means in a plane defined by the X and Y axes, said system means including first motor means for controlling the motion of said movable means along the X axis of said plane and second motor means for controlling the motion of said movable means along the Y axis and further including means including the first motor means for providing movements of the movable means along the X axis at full speeds between first and second selected boundaries to provide a movement of the movable means alternately in a first path along the X axis from the first boundary to the second boundary and alternately in an opposite path along the X axis from the second boundary to the first boundary,
   means including the second motor means for indexing the movable means for movement at a substantially uniform speed through a vertical index distance upon each traversal of the movable means between the first and second boundaries and during the movement of the movable means by the first motor means along the X axis; and
   alignment means for aligning said wafer relative to said energy means for movement of the movable means along said X axis, said alignment means including means for defining first and second alignment boundaries along said X axis and for controlling said first motor means to move said support means along said X axis back and forth between said alignment boundaries.

7. A system as recited in claim 6 wherein said alignment means includes means for defining first and second boundaries along the Y axis, and means for controlling said first motor means to move said movable means each of a plurality of horizontal index distances between said X boundaries at a substantially uniform speed during the movement of the movable means in the Y direction at positions past the Y boundaries and means for controlling said second motor means to move said movable means at full speed in a first path along the Y axis and alternately in an opposite path along the Y axis between said Y boundaries at full speeds upon the movement of the movable means in the paths at full speeds along the X axis to a position simultaneously beyond the boundaries of the X and Y axes.

8. A system as recited in claim 7 wherein said first motor means includes a first bidirectional stepping motor and a first motor control circuit and a first counter responsive to a movement of the movable means through a vertical index distance for storing in the counter a number representing the number of steps of said first motor required to move said movable means a distacne at least equal to the distance between the first and second boundaries along the X axis.

9. A system as recited in claim 6 wherein said system means include means including the second motor means for providing movements of the movable means along the Y-axis at full speeds between third and fourth selected boundaries to provide a movement of the movable means alternately in a first path along the Y-axis from the third boundary to the fourth boundary and alternately in an opposite path along the Y-axis from the fourth boundary to the third boundary and further include means including the first motor means for indexing the movable means through a horizontal index distance upon each traversal of the movable means along the Y-axis between the third and fourth boundaries.

10. A system as set forth in claim 9, including, means for initially providing movements at full speeds of the movable means along the X-axis between the first and second boundaries and means responsive to the simultaneous traversal of the movable means past a selected one of the first and second boundaries and a selected one of the third and fourth boundaries for subsequently providing movements of the movable means along the Y-axis at full speeds between the third and fourth boundaries.

11. A system as recited in claim 10 wherein said alignment means include viewing means for viewing the wafer, said viewing means including an X axis indicator aligned with said X axis, whereby when the lines of said first plurality of lines are parallel to said indicator said first plurality of lines are aligned in said X axis, said alignment means further including means for rotating said movable means about an axis perpendicular to the plane defined by the X and Y axes to thereby align said first plurality of lines to be parallel to said indicator.

12. A system as recited in claim 11 wherein said first motor means includes a first bidirectional stepping motor and a first motor control circuit and a first counter and responsive to each movement of the movable means through a vertical index distances during the movements of the movable means at full speeds along the X axis for storing in the counter a number representing the number of steps of said first motor required to move said movable means a distance at least equal to the distance between the first and second boundaries and said second motor means includes a second bidirectional stepping motor and a second motor control circuit and a second counter and responsive to each movement of the movable means through a horizontal index distance during the movements of the movable means at full speeds along the Y axis for storing in the second counter a number representing the number of steps of the second motor required to move the movable means a distance at least equal to the distance between the third and fourth boundaries.

13. A system as set forth in claim 10 wherein means are included for providing a movement of the movable means in a particular searching path after the alignment of the movable means along the X and Y axes and means are responsive to the simultaneous traversal by the movable means past one of the first and second boundaries and past one of the third and fourth boundaries in the searching path for initiating the movement of the movable means alternately between the first and second boundaries.

14. A system as set forth in claim 13 wherein the means providing for the movement of the movable means in the searching path initially provides a movement of the movable means in a first path along the Y-axis between the third and fourth boundaries past one of such boundaries and then provides a movement of the movable means in an opposite path for a particular distance along the Y-axis and then provides a movement of the movable means in a first path along the X-axis between the first and second boundaries past one of such boundaries.

15. In a scribe system for cutting kerfs in a wafer on which a plurality of circuits are deposited, the circuits being spaced so as to define a first plurality of streets parallel along an X axis and a second plurality of streets parallel along a Y axis perpendicular to said X axis, the arrangement comprising:

energy means for providing a beam of energy capable of cutting the wafer in a direction transverse to the X and Y axes;

movable means for providing a movement of the wafer relative to the energy along the X and Y axes;

system means for controlling the motion of said movable means in a plane defined by the X and Y axes, said system means including first motor means for controlling the motion of said movable means along the X axis of said plane and second motor means for controlling the motion of said movable means along the Y axis;

the system means including the first motor means and first additional means for providing alternate movements at full speeds of the movable means between first selected boundaries along the X-axis and including the second motor means and second additional means for providing a stepping of the wafer relative to the energy means between adjacent streets along the X axis upon each traversal by the movable means at full speeds of the first selected boundaries along the X-axis and during the movement of the movable means along the X-axis;

viewing means including an X axis indicator for viewing said wafer with said X axis indicator superimposed thereon along said X axis;

alignment control means including actuatable means for activating said system means in an alignment mode in which said support means is moved back and forth along said X axis to provide for the direction of the energy by the energy means along one of the streets in the second plurality; and actuatable means for rotating said support means about an axis perpendicular to said plane defined by said X and Y axes so that said streets in the first plurality are parallel with the X axis.

16. A system as recited in claim 17 wherein said viewing means comprises a microscope and said X axis indicator comprises a first cross hair aligned in said X axis whereby when the first plurality of streets is not aligned with the X axis the streets seem to oscillate above and below said first cross hair, as said support means is moved back and forth in said X axis.

17. A system as recited in claim 15 wherein said system means includes means operable during the alignment of the movable means along the X and Y axes to provide X axis alignment boundaries which control the extent of the back and forth movement of said means along said X axis, the distance between the X axis alignment boundaries being less than the distances between the outer streets of said second plurality of streets.

18. A system as set forth in claim 15 including, the system means including the second motor means and third additional means for providing alternate movements of the movable means at full speeds along the Y-axis between second selected boundaries along the Y axis and including the first motor means and fourth additional means for providing a stepping of the wafer relative to the energy means between adjacent streets along the Y-axis upon traversal by the movable means at full speeds of the first selected boundaries along the Y-axis and during the movement of the movable means along the Y-axis.

19. A system as set forth in claim 18 wherein means are responsive to the traversal by the movable means simultaneously beyond one of the first selected boundaries and one of the second selected boundaries for interrupting the operation of the first and second additional means in moving the movable means at full speeds along the X-axis and indexing the movable means along the Y-axis and providing an operation of the third and fourth additional means in moving the movable means at full speeds along the Y-axis and indexing the movable means along the X-axis.

20. A system as set forth in claim 19 wherein means are included for providing a movement of the movable means in a particular searching path after the alignment of the movable means along the X and Y axes and means are responsive to the traversal by the movable means beyond one of the first selected boundaries and one of the second selected boundaries in the searching path for initiating the operation of the first additional means and the second additional means in moving the movable means at full speeds along the X-axis and indexing the movable means along the Y-axis.

21. A system as set forth in claim 20 wherein the means providing for the movement of the movable means in the searching path initially provides a movement of the movable means in a first path along the Y-axis between the second pair of boundaries past one of such boundaries and then provides a movement of the movable means in an opposite path for a particular distance along the Y-axis and then provides a movement of the movement of the movable means in a first path along the X-axis between the first pair of boundaries past one of such boundaries.

22. A system as recited in claim 16 wherein said microscope further includes a second cross hair, perpendicular to said first cross hair, and said arrangement further includes means for supplying stepping pulses to said first motor means for moving said movable means in said X axis until said second cross hair bisects one of the streets of said second plurality of streets.

23. A system as recited in claim 22 further including means for supplying stepping pulses to said second motor means for moving said movable means in said Y axis after said first plurality of streets has been aligned in said X axis until said first cross hair substantially bisects one of the streets of said first plurality of streets.

* * * * *